(12) United States Patent
Stern (10) Patent No.: US 9,264,440 B1
(45) Date of Patent: Feb. 16, 2016

(54) PARALLEL DETECTION OF UPDATES TO A DOMAIN NAME SYSTEM RECORD SYSTEM USING A COMMON FILTER

(71) Applicant: Farsight Security, Inc., San Mateo, CA (US)

(72) Inventor: Henry Stern, Halifax (CA)

(73) Assignee: FARSIGHT SECURITY, INC., San Mateo, CA (US)

( * ) Notice: Subject to any disclaimer, the term of this patent is extended or adjusted under 35 U.S.C. 154(b) by 0 days.

(21) Appl. No.: 14/817,880

(22) Filed: Aug. 4, 2015

(51) Int. Cl.
*H04L 29/06* (2006.01)
*H04L 29/12* (2006.01)

(52) U.S. Cl.
CPC ........ *H04L 63/1408* (2013.01); *H04L 61/1511* (2013.01)

(58) Field of Classification Search
CPC .................. H04L 63/1408; H04L 61/1511
See application file for complete search history.

(56) References Cited

U.S. PATENT DOCUMENTS

| 8,849,838 B2 * | 9/2014 | Wang ............... G06F 17/30979 707/721 |
| 2006/0294311 A1 * | 12/2006 | Fu et al. ........... G06F 17/30902 711/118 |
| 2009/0300016 A1 * | 12/2009 | Kile, Jr. .............. G06F 3/04817 |

OTHER PUBLICATIONS

Tian et al. "Loop Mitigation in Bloom Filter Based Multicast: A Destination-Oriented Approach, 2012 IEEE, pp. 2131-2137".*
Connery, "DNS Response Policy Zones, Jun. 15, 2013, 21 pages".*

* cited by examiner

*Primary Examiner* — Oleg Korsak
(74) *Attorney, Agent, or Firm* — Sterne, Kessler, Goldstein & Fox P.L.L.C.

(57) ABSTRACT

In an embodiment, a computer-implemented method detects updates to a domain name system record system. In the method, a stream of data points is received with each data point describing a record of a domain name system. For respective data points, a processor is selected from a plurality of processors. The processors are each configured to apply a data point against a common filter that assesses whether the data point is in a set. At the selected processor, the respective data point is applied to the common filter to determine whether the record is included in the set. When the record is determined not to be included in the set, a message is provided to indicate that the domain name system includes a new record, and the common filter is updated to include the data point in the set.

18 Claims, 4 Drawing Sheets

PARALLEL DETECTION OF UPDATES TO A DOMAIN NAME SYSTEM RECORD SYSTEM USING A COMMON FILTER

BACKGROUND

1. Field

This field is generally related to network security, and more specifically collecting and processing Domain Name System (DNS) records.

2. Related Art

A communication network may, for example, allow data to be transferred between two geographically remote locations. To transmit data over a network, the data is often divided into pieces, known as packets or blocks. Each packet or block may have a destination network address, such as an IP address, that indicates a destination of the packet and intermediate forwarding devices where the packet should be routed. These addresses are often numerical, difficult to remember, and may frequently change.

To identify a destination, domain names are frequently used. Domain names identify a destination host, or server, and may map to a corresponding network address. For example, the domain name www.example.com may map to the network address 93.184.216.119. To map the domain names to the network addresses, a domain name system (DNS) may be used. DNS may divide the namespace into a hierarchy with different organizations controlling different portions of the hierarchy. In different portions of the hierarchy, different name servers may store resource records that map domain names to network addresses.

To look up a network address from a domain name, DNS may use resolvers that execute a sequence of queries to different name servers. For example, the sequence of queries to resolve www.example.com may start at the root name server, which indicates the address of the name server for .com. Then, the DNS resolver may query the name server for .com for the address of the name server for example.com. Then, the DNS resolver may query the name server for example.com for the address of www.example.com. In practice, so that a resolver does not need to go through the entire sequence for each request, the resolver may cache the addresses of the various name servers.

Many new domains are registered every day. But not all domains are registered for legitimate purposes. Some domains are registered for malicious purposes. One malicious purpose is to bring down a network service. These may be called denial of service attacks. One example of a denial of service attack is Transport Control Protocol (TCP) SYN flood abuse.

Other network abuses may not be trying to bring down a service, but may instead be making network requests, including application-level requests, for other improper purposes. In these abuses, an automated system may be making application requests that, for example, set up fake user accounts and try to entice a user to devolve confidential information, such as her password, credit card information, or Social Security number, or run other scams. Domains may be registered to support these abuses as well as other types of network abuses including malware, phishing, or spam.

To protect against network abuses, network administrators can configure DNS resolvers to block or redirect lookups to domain names believed to be malicious. For example, Domain Name Service Response Policy Zones (DNS RPZ) provide a mechanism to block or redirect specified domain name lookups.

In these network abuses, the attackers often use their domain names shortly after registration and for a short period of time. In contrast, legitimate web services may not use their domains so soon after registration and continue to use their domains for a long period of time. Hence, newly observed domains (NOD), for example those that have been registered within a particular period of time, e.g. the last 5 minutes, 1 hour, 12 hours or even 24 hours, may be identified as potentially malicious. Services are available to provide these newly observed domains to DNS resolvers to block domain name lookups for that period of time. But tracking newly observed domains on a large scale can be computationally intensive.

Systems and methods are needed to more efficiently detect newly observed domains.

BRIEF SUMMARY

In an embodiment, a computer-implemented method detects updates to a domain name system record system. In the method, a stream of data points is received with each data point describing a record of a domain name system. For respective data points, a processor is selected from a plurality of processors. The processors are each configured to apply a data point against a common filter that assesses whether the data point is in a set. At the selected processor, the respective data point is applied to the common filter to determine whether the record is included in the set. When the record is determined not to be included in the set, a message is provided to indicate that the domain name system includes a new record, and the common filter is updated to include the data point in the set.

System and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Embodiments speed the process of identifying new domain name records by using multiple processors that share a common filter. The filter is configured to determine whether the domain record information is in a set of information previously detected. If the filter indicates that detected domain name record information is not in the set, then the domain is identified as newly observed. When the domain is newly observed, the domain information is queued to be written to the common filter. The processors may operate in parallel, for example on different threads or even different machines in a distributed computing environment. In contrast, all the queued newly observed domains may be written to the comment filter using a single writer thread to provide coherency and prevent deadlocks.

By having multiple processors operating in parallel, embodiments can detect new domain name records more quickly and efficiently. In particular, neither the multiple reader threads nor the writer may be required to acquire a lock on the common filter. In this way, embodiments allow for scalability, enabling the system to process large volumes of data quickly. For example, the techniques disclosed herein may be useful for detecting updates to other large, distributed databases.

While embodiments are described with respect to domain name data for illustrative purposes, persons of skill in the art will recognize that aspects of the present disclosure, such as having parallel reader processors comparing data against a common filter, will apply to other types of data as well. In this way, embodiments may be used to detect changes in a variety of different data types.

The Detailed Description that follows is divided into sections. The first section describes, with respect to FIG. 1, a system for detecting new DNS records among a large from a stream of DNS data. The second section describes, with respect to FIG. 2, a mechanism for updating a common filter used to identify the novelty of each DNS record. The third section describes, with respect to FIG. 3, an application of the DNS data processing system for network security. Finally, the fourth section describes, with respect to FIG. 4, a method for identifying new DNS records not previously observed which may be used in operation of the system in FIG. 1.

Identifying New DNS Records

Figure 1:
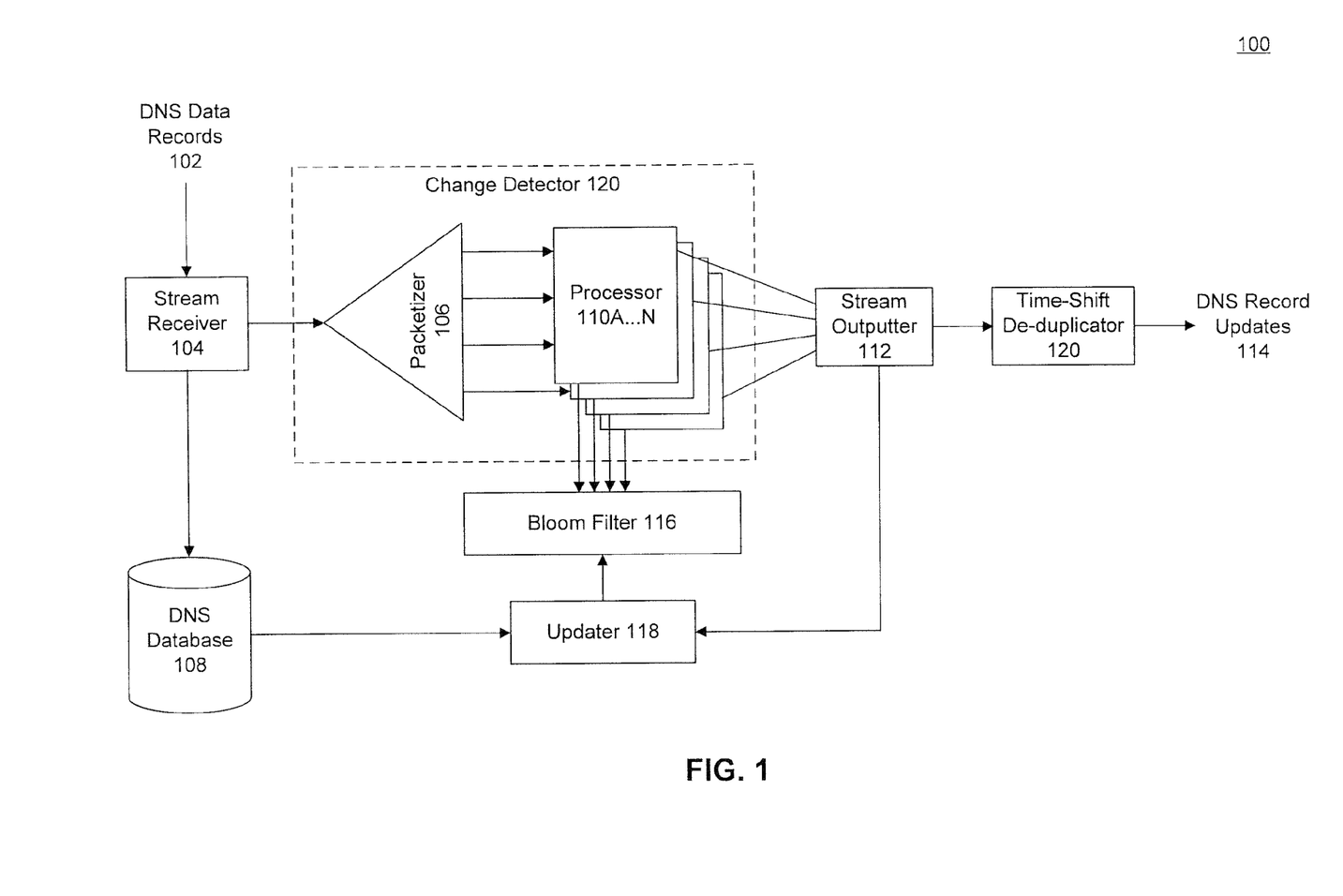
FIG. 1 is a diagram that illustrates a system for identifying new DNS records not previously observed according to an embodiment.

FIG. 1 is a diagram that illustrates a DNS data processing system 100. DNS data processing system 100 identifies new DNS records not previously observed by the system and not recorded in the DNS database. DNS data processing system 100 includes a stream receiver 104, a change detector 120, a Bloom filter 116, a stream outputter 112, a DNS database 108, an updater 118, and a time-shift duplicator 120. Each of these components as described below.

DNS data processing system 100 receives DNS data records 102 as input. DNS data records 102 may be a stream of data points with each data point describing a record of a domain name system. DNS response records 102 may be detected from the DNS records observed by an array of DNS sensor nodes, as will be described below with respect to FIG. 3. This data provides a snapshot of DNS configuration and content data as it is being consumed on the internet, in real time.

DNS response records may be decomposed into multiple Resource Record Sets (RRset). An RRset may include one or more DNS resource records (RR). An RR may be a single DNS record, and may include several fields. These fields include:
- an owner name field, which may specify a Fully Qualified Domain Name (FQDN) such as www.example.com for which a DNS query was generated;
- a time to live (TTL) field, which may indicate an amount of time in seconds that the RR may be cached.
- a class field, which may indicate a protocol family or an instance of the protocol such as "IN" for internet protocol.
- a type field, which may indicate a type of the DNS record. An example of an RR type is type "A" (answer) which indicates that the DNS record maps an FQDN to an IPV4 address. As another example, an RR type "AAAA" indicates that the DNS record maps an FQDN to an IPV6 address.
- type-specific data, such as an IP address mapped to the queried FQDN.

In an example, as mentioned above, a DNS record may map a Fully Qualified Domain Name (FQDN) to an Internet Protocol (IP) address. An RRset may be a set of all the resource records of a given type for a given domain. For example, multiple RRs may map a FQDN such as www.example.com to multiple different IPV4 address. In this example, the RRset for www.example.com contains all of these IPV4 addresses.

In an embodiment, DNS data records 102 may be reformatted so that they can be read by stream receiver 104. Additionally, DNS data records 102 may undergo some de-duplication to remove some repeated DNS records before DNS data records 102 are provided to stream receiver 104.

Stream receiver 104 is a communication channel that receives DNS data records 102. Stream receiver 104 may, for example, be implemented using a dedicated communication port, such as a UDP port, listening for DNS data records. In another example, stream receiver 104 may be implemented using a VLAN channel. Stream receiver 104 forwards the received data stream to change detector 120 and stores it in DNS database 108.

Change detector 120 includes a packetizer 106 and multiple processors 110 A . . . N. Packetizer 106 fans out the received DNS records to multiple processors 110 A . . . N. In particular, packetizer 106 may package the DNS information received from stream receiver 104 into packets. In embodiments, each RR or RRset may be packaged into a single packet. In other embodiments, several RRs or RRsets may be packaged together into a single packet. In a third embodiment, a hybrid approach may be used where larger RRsets have their own packets, and smaller RRsets may be grouped together in packets. In this embodiment, the packets may be assembled to have similar sizes and distribute the computing burden between multiple processors 110 A . . . N. In this way, change detector 120 organizes the DNS data points into a plurality of packets.

After organizing the DNS data points into a plurality of packets, packetizer 106 selects a processor from a plurality of processors to send each packet. To select a processor, packetizer 106 may use a round robin or load balancing scheme. After selecting the processor 110 for a packet, packetizer 106 transmits the packet to a communication port of the selected processor 110. In an example, the DNS records are sent to the processors 110 A . . . N using a User Datagram Protocol (UDP). Other protocols, including other transport layer protocols, such as Transmission Control Protocol (TCP), may also be used.

Each processor 110 may be a virtual processor or a physical processor. All processors 110 A . . . N may reside on one machine, or alternatively on separate machines. Each processor 110 may have a different thread of execution, operating independently of the other. Each processor 110 may be assigned a communication port on which it listens to the data that may be received from packetizer 106.

On receipt of a packet, a processor 110 parses it to retrieve different data points, such as different fields of the DNS resource records. Processor 110 may generate keys based on the obtained information. In an example embodiment, processor 110 generates five types of keys for each RRset:

(1) a D key is generated from derived base domain name of the record (E.g., "example.com"), (2) an N key is generated from the FQDN of the record (e.g., "www.example.com"), (3) a T key is generated using the FDQN and the RRtype (e.g., "www.example.com" and "IPv4"), (4) one or more R keys are generated, one for each RR in an RRset, using also the FQDN and RRtype (e.g., "IPv4," and "93.184.216.119", "93.184.216.120," . . . ), and (5) an S key is generated using the RRset, RRtype and FQDN.

These five keys may be used as criteria to describe the domain name. If any or all of these keys have not been previously received, the domain name may be identified as newly observed.

Additional or alternative keys, or similar keys using different features of RRsets, may be generated to describe a RRset. For example, other keys may be generated from: (1) the first seen and last seen timestamps of an RRset, (2) the server IP that the RRset originated from, (3) the DNS bailiwick (the domain for which the server IP that the record came from was authoritated, e.g. a root server or a delegation server, etc.) associated with an RRset. These keys may also be used to generate the "S" key above. The keys may be generated from the retrieved information from DNS records using different methods. In an example, a hash function may be applied to the strings obtained from each DNS record to determine the respective keys.

Processor 110 applies the keys generated for each DNS record to Bloom filter 116. Bloom filter 116 is a filter common to and shared among processors 110A . . . N. A filter may be configured according to a set of data and is used to manner test whether data is in that set. A Bloom filter may be a space-efficient probabilistic data structure. False positive matches may be possible, but false negatives may not be. In other words, a query on a Bloom filter returns either "possibly in set" or "definitely not in set". Elements may be added to the set, but not removed. The more elements that are added to the set, the larger the probability of false positives. A Bloom filter is illustrative, but other types of filters may be used.

In an embodiment, multiple common filters may be used, one for each type of key identified above. In that embodiment, each filter is configured according to the set of keys generated of that type, for example, the set of "N" keys generated from the FQDN of the record. And processor 110 looks up each key in its corresponding filter.

If Bloom filter 116 determines that all of the keys generated from the DNS record already match a previously entered key in Bloom filter 116, processor 110 drops the record.

Otherwise, if Bloom filter 116 determines any of the keys describing the domain name record to not be in the set of previously received keys, processor 110 determines that the domain name record is newly observed. Based on which key is absent from Boom filter 116, processor 110 may also determine which field of the domain name record has been updated. Processor 110 may provide a message identifying the newly observed DNS resource record and a reason why DNS resource record is considered newly observed to stream outputter 112.

For example, in the five example keys above, the reason for the record's novelty that processor 110 provides to stream outputter 112 may be any of code identifying the five keys ("D", "N", "T", "R", "S"). For example, if the DNS record includes a new base domain name (for example, "example.com" is detected as new), all five keys would be new, so the reported reason may be "DNTRS". In a second example, if a new FQDN is identified, but the base domain remains the same (for example, "www.example.com" was previously detected, but "ftp.example.com" is new), the reason would be "NTRS". In a third example, if a new RRtype is identified for the same FQDN (for example only IPv4 addresses may be previously only detected for "www.example.com" but an IPv6 address is detected), the reason would be reported as "TRS." In a fourth and final example, if a new resource record is identified (for example "www.example.com" has a new IP address mapped to it), the reason would be "RS", and finally, if a new RRset is identified, the reason would be "S".

Processors 110A . . . N send the messages that identify the newly observed domains to stream outputter 112. Stream outputter 112 forwards the stream of messages to updater 118 and time-shift de-duplicator 120.

Updater 118 may update Bloom filter 116 based on the DNS records that were identified as new and the DNS records stored in DNS database 108. In particular, it updates Bloom filter 116 such that the set it tests against includes the newly observed DNS records. In this way, if change detector 120 receives the DNS records again, Bloom filter 116 will identify them as being in the set of previously received DNS records and will drop them. Updater 118 also retrieves new changes to DNS database 108 and, according to those changes, updates Bloom filter 116. The operation of updater 118 is described in greater detail below with respect to FIG. 2.

A lag may occur before updater 118 updates Bloom filter 116. If a DNS record is observed again before updater 118 gets a chance to enter it into Bloom filter 116, the same record may be identified as novel more than once. Hence, duplicates may exist in the DNS records outputted from stream outputter 112. To remove such duplicates, the resulting DNS records from stream outputter 112 enter a time-shift de-duplicator module 120, which further de-duplicates these records.

Time-shift de-duplicator module 120 may operate, for example, by storing all the messages received by stream outputter 112 within a certain period. The period may be selected according to the lag time of updater 118 in updating Bloom filter 116. When a new message comes in, time-shift de-duplicator module 120 may compare that message with the messages it has stored. In one example, timeshift de-duplicator module 120 may use a hash table to represent the messages. If the message matches what timeshift de-duplicator module 120 has previously stored, time-shift de-duplicator module 120 may drop the duplicate packet. Otherwise, timeshift de-duplicator module 120 may forward the message on as a DNS record update 114.

In this way, system 100 receives DNS data records 102, analyzes the records, and identifies which are newly observed. The newly observed records are forward on as DNS record updates 114. As described in greater detail below with respect to FIG. 3, the record updates 114 may be used to block newly observed domains, improving security.

Updating the Common Filter

Figure 2:
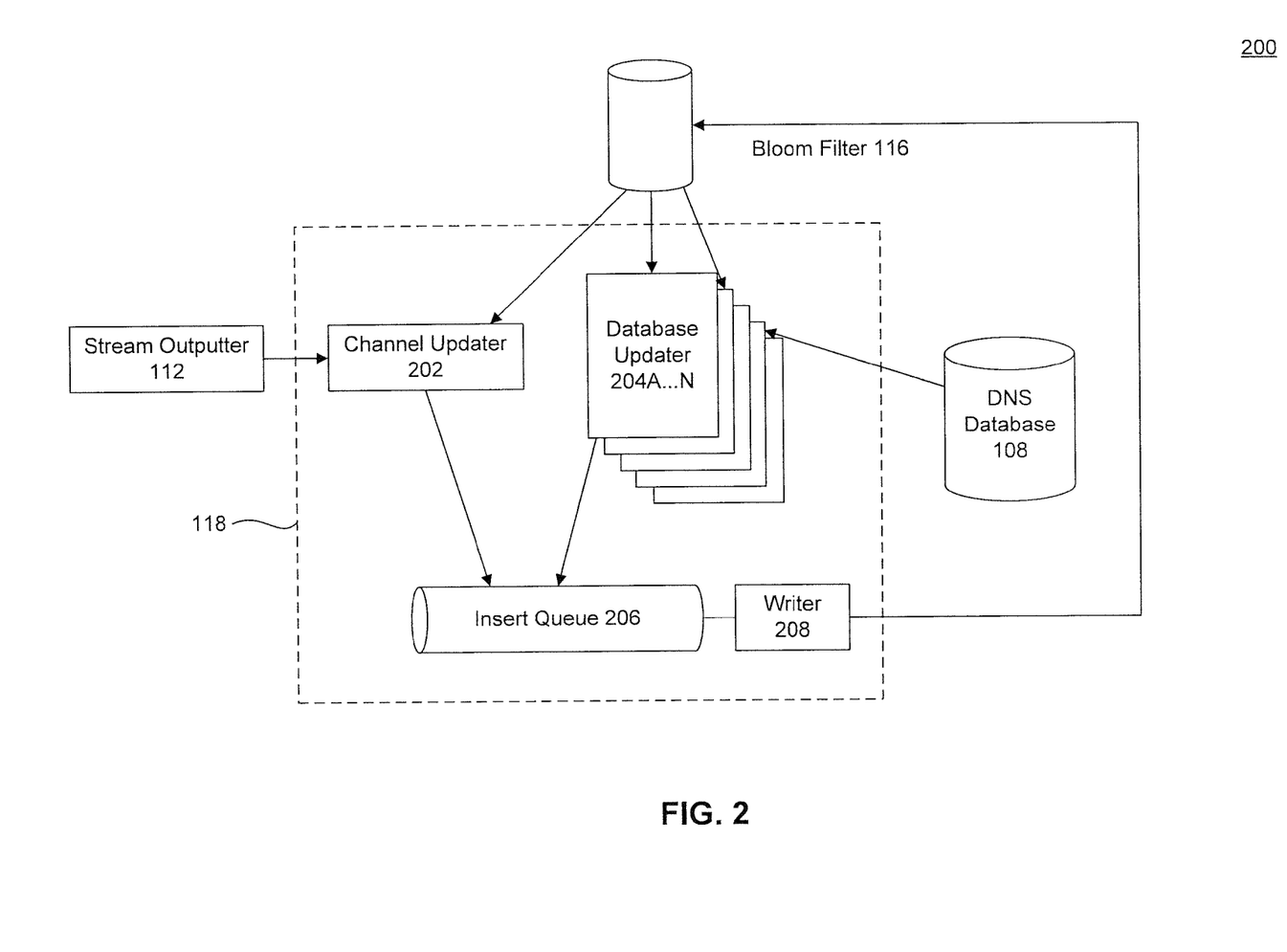
FIG. 2 is a diagram that illustrates the example architecture of an updater as displayed in FIG. 1 in more detail.

FIG. 2 is a diagram that illustrates a system 200 to update a filter. System 200 may be a subsystem of the system in FIG. 1. From system 100, system 200 includes stream outputter 112, DNS database 108, Bloom filter 116, and updater 118. Updater 118 includes several modules: a channel updater 202, a plurality of database updaters 204A . . . N, an insert queue 206, and a writer 208. Each of these modules is described below.

System 200 starts by receiving the DNS records identified as newly observed from stream outputter 112. As discussed for system 100, stream outputter 112 transmits the records as messages to updater 118. In updater 118, these messages are received by channel updater 202.

Channel updater 202 may be implemented using a thread dedicated to listen to stream outputter 112. For example, channel updater 202 may listen on a TCP or UDP port for data from stream outputter 112. Once channel updater 202 receives the DNS updates from stream outputter, channel updater 202 inserts the updates into insert queue 206. Channel updater 202 may insert the updates into insert queue 206 without acquiring a lock on Bloom filter 116.

Insert queue 206 may be a multi-process queue shared by multiple processes, e.g., channel updater 202 and database updaters 204 A . . . N, that queue items on it, and a writer 208. Writer 208 repeatedly de-queues items insert queue 206 it and updates Bloom filter 116 such that the set Bloom filter 116 tests against includes the items.

By receiving updates from channel updater 202, Bloom filter 116 is updated to reflect new DNS data as it is collected in real time or near real time. However, Bloom filter 116 may also need to be updated to reflect historical DNS data previously collected. To do that, system 200 uses database updaters 204A . . . N.

Database updaters 204 A . . . N may be each implemented on a separate processor, or on a separate machine, or be simply multiple processes on a single machine. Each DNS record stored in DNS database 108 is processed by one of the database updaters 204. Similar to the mechanism described with reference to change detector 120 of FIG. 1, the decision on which database updater 204 should process the next DNS record may be made by a round robin mechanism or other load distribution mechanism.

Similar to the operation of change detector 120 of FIG. 1, each database updater 204 generates multiple keys for each DNS record it processes. Database updater 204 then applies Bloom filter 116 to generated keys to determine whether they are in the filter's set of previously received keys. If all of the keys generated from the DNS record already match a previously entered key in Bloom filter 116, database updater 204 may take no action.

In contrast, if any of the keys generated from the DNS record do not match a previously entered key in Bloom filter 116, the DNS record may be identified as newly observed, and at least one of the keys are added to insert queue 206 (again without acquiring a lock) to be entered into Bloom filter 116.

Finally, writer 208 may (implemented e.g. using a dedicated thread) de-queue DNS record data or keys one by one from insert queue 206. Writer 208 may generate multiple keys for each DNS record it de-queues as previously described. And Writer 208 enter the keys into Bloom filter 116. Writer module 208 may not acquire any lock for updating Bloom filter 116.

In this way, system 200 updates Bloom filter 116 with historical DNS data from DNS database 108 and newly detected DNS data from stream outputter 112.

Using the DNS Data Processing System for Network Security

Figure 3:
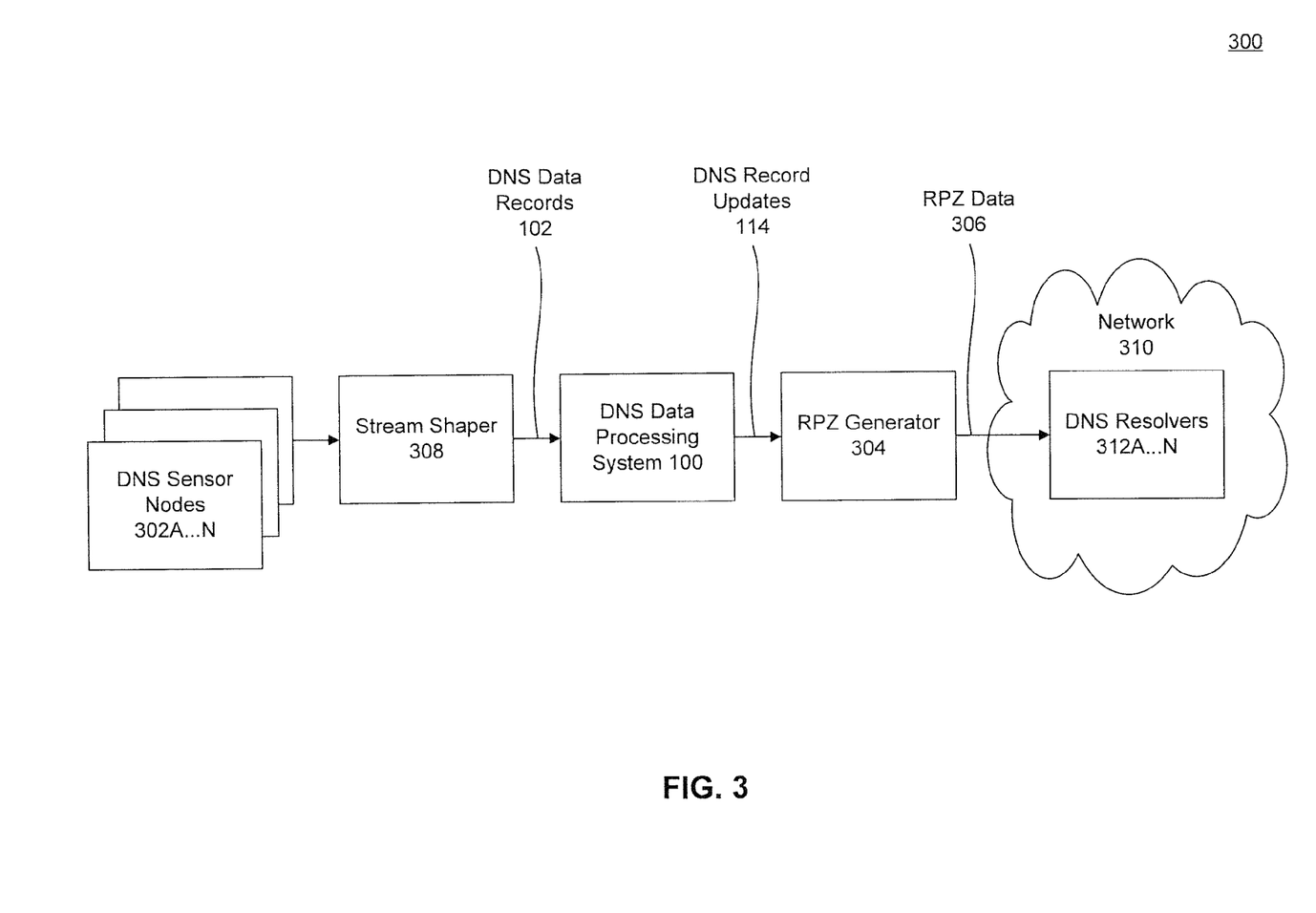
FIG. 3 is a flowchart that illustrates an example application of the system in FIG. 1 to block potentially malicious domain names.

FIG. 3 illustrates an application of the DNS data processing system 100 according to an embodiment. In particular, FIG. 3 illustrates a system 300 that informs DNS resolvers of newly detected domains so that they can block the new domains for a period of time. System 300 includes DNS sensor nodes 302 A . . . N, a stream shaper 308, the DNS data processing system 100 of FIG. 1, and RPZ generator 304, and, on a network 310, DNS resolvers 312A . . . N.

Multiple DNS sensor nodes 302 A . . . N observe DNS queries resolved by DNS servers and resolvers, and record them. DNS sensor nodes 302 A . . . N may be placed at strategic observation points around the world. They may be in production networks at Internet service providers (ISPs), Internet exchanges, Internet cloud service operators, prominent social networks, universities, and large corporations. Multiple DNS sensor nodes 302 A . . . N may send the collected DNS information to stream shaper 308.

Stream shaper 308 may perform an initial de-duplication process on these records and remove repeated DNS records. In this way, stream shaper 308 produces a smaller set of DNS records, illustrated as DNS data records 102. In an example embodiment, stream shaper 308 may also reformat the DNS records 102 from a first format to a second format compatible with the format requirements of the DNS data processing system 100. After stream shaper 308 processes the records it provides them to DNS data processing system 100.

As described above for FIG. 1, DNS data processing system 100 performs further processing such as filtering and deduplication on DNS data records 102. DNS data processing system 100 also identifies DNS records, among DNS records 102, that correspond to NODs, and updates its database of DNS records, as previously described with reference to FIGS. 1 and 2. The output of the DNS data processing system 100 is a distilled and filtered list of DNS records updates 114 that are delivered to Response Policy Zone (RPZ) generator 304.

RPZ generator 304 uses the received DNS record updates 114, and converts them to a standardized RPZ format. RPZ generator 304 may further use this data to update an RPZ database (which includes a list of blacklisted websites containing malicious data such as spam and malware). RPZ generator 304 may have a policy to block newly observed domains for a particular period of time. For example, a network administrator may configure RPZ generator 304 to generate RPZ data 306 that blocks newly observed domains for the 10 minutes after they are first observed. In one possible embodiment, RPZ data 306 may be issued every 10 minutes to block a list of all the domain names first observed in the last 10 minutes.

RPZ data 306 may be accessed and used by DNS resolvers, e.g. DNS resolvers 312 A . . . N on network 310. When an application, such as a web browser, wants a network (e.g., IP) address of a particular domain name, it sends a request to a DNS resolver 312. Before responding the request, DNS resolver 312 may check its RPZ data to determine if the site is blacklisted. If it is not blacklisted, DNS resolver 312 may execute the recursive queries to resolve the domain name's corresponding network address. If the domain name is blacklisted, DNS resolver 312 may not respond to the request or may respond to the request with an IP address of a website indicating that the requested domain has been blocked and is potentially malicious.

In this way, system 300 uses the newly observed domains detected by system 100 to block domain names that are potentially malicious.

A Method for Detecting Updates to a DNS Record System

Figure 4:
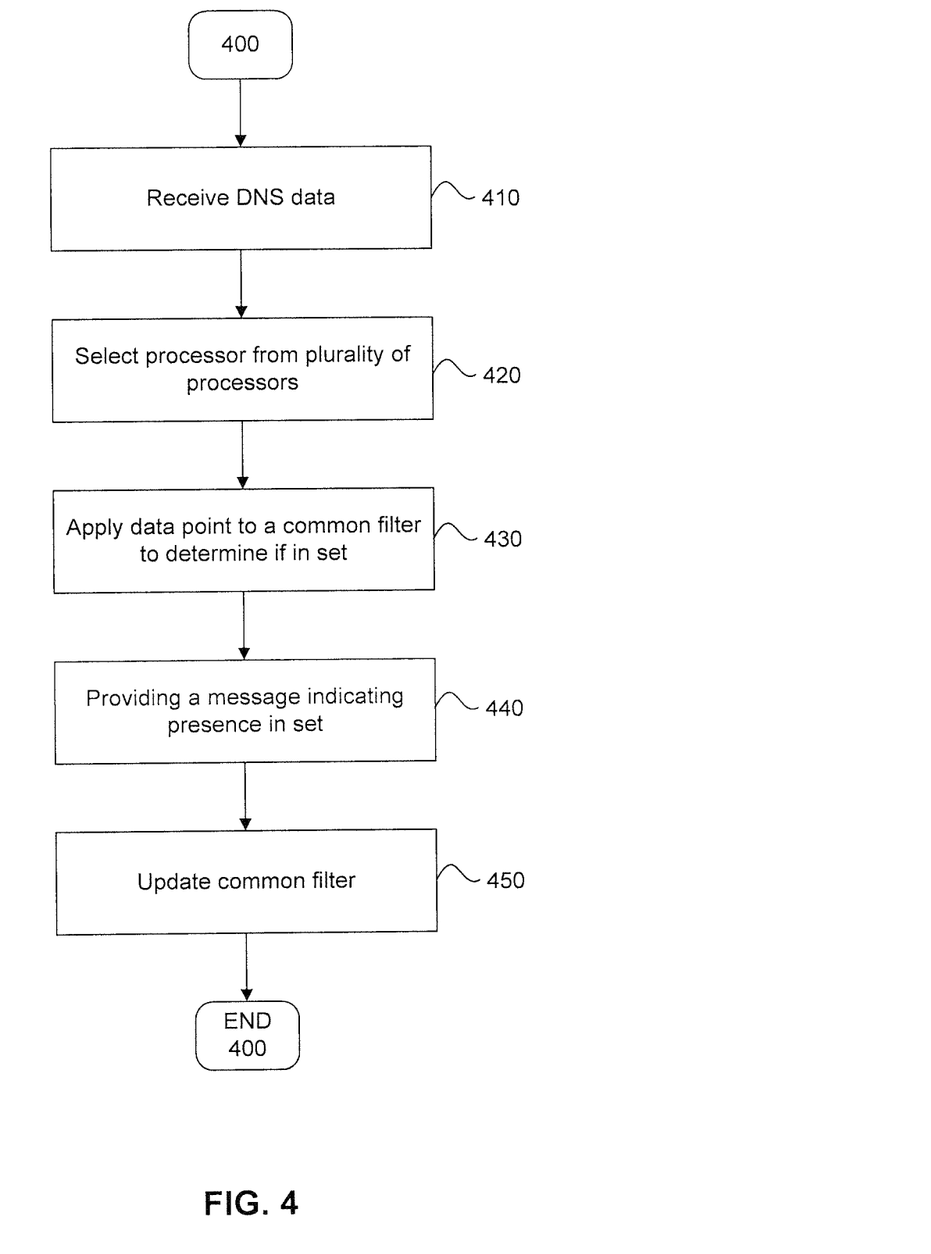
FIG. 4 is a flowchart that illustrates a method for identifying new DNS records not previously observed according to an embodiment.

FIG. 4 is a flowchart that illustrates a method 400 for checking the existence of DNS data records in a set, and updating the set every time a DNS data record contains novel data not previously entered in the set using a multi-processor scheme. This method may be used both in operation of system 100 illustrated in FIG. 1 and system 200 illustrated in FIG. 2.

In this method, a group of DNS data records are received in step 410. To accelerate the processing of the received DNS data, parallel processing is used in step 420 by assigning the task of processing each received DNS data record to one processor among a plurality of available processors. The assignment of a newly received DNS data record to a particular processor may be based on a variety of schemes. For example, a round robin mechanism may be used to evenly distribute the processing load among all processors. Alternatively, the assignment may be based on a hash function applied to the newly received DNS data record.

In step 430, the selected processor processes the DNS record. For example, in an embodiment, the selected processor may use the information in this data record to generate a plurality of keys in step 430. Additionally, in step 430, the information in the data record is applied to a common filter to find out whether the data record contains any novel information not previously stored in the set. For the example embodiment that the selected processor generates a plurality of keys based on each DNS record, the generated keys may be looked up in a Bloom filter that contains the current set to determine if any of the keys is new to the Bloom filter.

In step 440, a message is generated based on the result of the lookup performed in step 430. In step 450, if the message indicates that the data record lookup of step 430 did result in identification of novel data (not already in the set), the common filter is updated to include the novel DNS data record in the set.

CONCLUSION

DNS database 108 may be any stored type of structured memory, including a persistent memory. In examples, this database may be implemented as a relational database or file system.

Each of the processors and modules in FIGS. 1, 2 and 3, including stream receiver 104, packetizer 106, processors 110A . . . N, stream outputter 112, Bloom filter 116, updater 118, stream outputter 112, time-shift de-duplicator 120, channel updater 202, database updater 204A . . . N, writer 208, DNS sensor nodes 302A . . . N, stream shaper 308, RPZ generator 304, and DNS resolvers 312A . . . N, may be implemented in hardware, software, firmware, or any combination thereof.

Each of the processors and modules in FIGS. 1, 2 and 3 may be implemented on the same or different computing devices. Such computing devices can include, but are not limited to, a personal computer, a mobile device such as a mobile phone, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions. Software may include one or more applications and an operating system. Hardware can include, but is not limited to, a processor, a memory, and a graphical user interface display. The computing device may also have multiple processors and multiple shared or separate memory components. For example, the computing device may be a part of or the entirety of a clustered or distributed computing environment or server farm.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for detecting updates to a domain name system record system, comprising:
    receiving a stream of data points each describing a record of a domain name system;
    for respective data points in the stream of data points:
    selecting a processor from a plurality of processors, each processor configured to apply a data point against a common filter that assesses whether the data point is in a set;
    applying, at the selected processor, the respective data point to the common filter to determine whether the record is included in the set;
    when the record is determined not to be included in the set:
        providing a message to indicate that the domain name system includes a new record; and
        updating the common filter to include the data point in the set,
    wherein the common filter is a Bloom filter.

2. The method of claim 1, further comprising:
    organizing the data points into a plurality of packets, wherein the selecting comprises selecting a processor for respective packets in the plurality of packets; and
    transmitting the packet to the selected processor to apply the common filter to each data point in the packet.

3. The method of claim 1, further comprising:
    for respective data points in the stream of data points, storing the record in a database; and
    updating the common filter based on the database.

4. The method of claim 3, further comprising:
    when the record is determined not to be included in the set, storing the record and data from the database into a queue; and
    retrieving data from the queue to update the common filter.

5. The method of claim 1, further comprising, in response to the message, blocking a domain associated with the record.

6. The method of claim 1, wherein the stream of data points includes: (i) a new base domain name from the domain name system, (ii) a fully qualified domain name from the domain name system, (iii) an indication of a resource record type of a fully qualified domain name from the domain name system, (iv) an identification of a resource record of a fully qualified domain name from the domain name system, and (v) an identification of a set of a resource record of a fully qualified domain name from the domain name system.

7. A non-transitory computer-readable medium having instructions stored thereon that, when executed by at least one computing device, causes the at least one computing device to perform a method for detecting updates to a domain name system record system, the method comprising:

receiving a stream of data points each describing a record of a domain name system;

for respective data points in the stream of data points:

selecting a processor from a plurality of processors, each processor configured to apply a data point against a common filter that assesses whether the data point is in a set;

applying, at the selected processor, the respective data point to the common filter to determine whether the record is included in the set;

when the record is determined not to be included in the set:

providing a message to indicate that the domain name system includes a new record; and updating the common filter to include the data point in the set, wherein the common filter is a Bloom filter.

8. The non-transitory computer-readable medium of claim 7, the method further comprising:

organizing the data points into a plurality of packets, wherein the selecting comprises selecting a processor for respective packets in the plurality of packets; and transmitting the packet to the selected processor to apply the common filter to each data point in the packet.

9. The non-transitory computer-readable medium of claim 7, the method further comprising:

for respective data points in the stream of data points, storing the record in a database; and updating the common filter based on the database.

10. The non-transitory computer-readable medium of claim 9, the method further comprising:

when the record is determined not to be included in the set, storing the record and data from the database into a queue; and retrieving data from the queue to update the common filter.

11. The non-transitory computer-readable medium of claim 9, the method further comprising, in response to the message, blocking a domain associated with the record.

12. The non-transitory computer-readable medium of claim 9, wherein the stream of data points includes: (i) a new base domain name from the domain name system, (ii) a fully qualified domain name from the domain name system, (iii) an indication of a resource record type of a fully qualified domain name from the domain name system, (iv) an identification of a resource record of a fully qualified domain name from the domain name system, and (v) an identification of a set of a resource record of a fully qualified domain name from the domain name system.

13. A system for detecting updates to a domain name system record system, comprising:

a computing device;

a stream receiver, implemented on the computing device, that receives a stream of data points each describing a record of a domain name system;

a plurality of processors, each processor configured to apply a data point against a common filter that assesses whether the data point is in a set;

a change detector, implemented on the computing device, that, for respective data points in the stream of data points, selects a processor from the plurality of processors, wherein the selected processor applies the respective data point to the common filter to determine whether the record is included in the set;

a stream outputter, implemented on the computing device, that, when the record is determined not to be included in the set, provider a message to indicate that the domain name system includes a new record; and an updater, implemented on the computing device, that, when the record is determined not to be included in the set, updates the common filter to include the data point in the set, wherein the common filter is a Bloom filter.

14. The system of claim 13, further comprising:

a packetizer that organizes the data points into a plurality of packets and transmits the packet to the selected processor to apply the common filter to each data point in the packet, wherein the change detector selects a processor for respective packets in the plurality of packets.

15. The system of claim 13, further comprising:

a database that stores the data points in the stream of data points, wherein the updater updates the common filter based on the database.

16. The system of claim 15, further comprising:

a queue that stores the record and data from the database into; and a writer that retrieves data from the queue to update the common filter.

17. The system of claim 13, further comprising an response policy zone generator that, in response to the message, blocks a domain associated with the record.

18. The system of claim 13, wherein the stream of data points includes: (i) a new base domain name from the domain name system, (ii) a fully qualified domain name from the domain name system, (iii) an indication of a resource record type of a fully qualified domain name from the domain name system, (iv) an identification of a resource record of a fully qualified domain name from the domain name system, and (v) an identification of a set of a resource record of a fully qualified domain name from the domain name system.

* * * * *